(12) United States Patent
Erickson (10) Patent No.: US 9,574,699 B2
(45) Date of Patent: Feb. 21, 2017

(54) SHIELD FOR PIPES CARRYING FLUID

(71) Applicant: Jeff Erickson, Saugus, CA (US)

(72) Inventor: Jeff Erickson, Saugus, CA (US)

( * ) Notice: Subject to any disclaimer, the term of this patent is extended or adjusted under 35 U.S.C. 154(b) by 0 days.

(21) Appl. No.: 14/811,777

(22) Filed: Jul. 28, 2015

(65) Prior Publication Data

US 2016/0290546 A1 Oct. 6, 2016

Related U.S. Application Data

(60) Provisional application No. 62/140,403, filed on Mar. 30, 2015.

(51) Int. Cl.
*F16L 3/00* (2006.01)
*F16L 57/00* (2006.01)

(52) U.S. Cl.
CPC ...................... *F16L 57/00* (2013.01)

(58) Field of Classification Search
CPC .......................................... F16L 3/00
USPC ....................... 138/110, 106, 107; 248/58, 62
See application file for complete search history.

(56) References Cited

U.S. PATENT DOCUMENTS

| | | | | |
|---|---|---|---|---|
| 3,315,927 A * | 4/1967 | Malloy | .................... | F16L 3/16 248/55 |
| 3,807,675 A * | 4/1974 | Seckerson | ................. | F16L 3/13 24/337 |
| 4,244,544 A * | 1/1981 | Kornat | ..................... | F16L 3/13 248/68.1 |
| 4,550,891 A * | 11/1985 | Schaty | ................. | F16B 21/071 174/166 R |
| 5,346,165 A * | 9/1994 | Frean | .................... | F17C 13/084 248/146 |
| 5,762,300 A * | 6/1998 | Sorkin | ...................... | E04C 5/10 248/72 |
| 6,691,742 B1 * | 2/2004 | Cooper | ..................... | F16L 3/14 138/106 |
| 8,087,431 B2 * | 1/2012 | Souza | ....................... | F16L 3/02 138/103 |
| 9,360,139 B1 * | 6/2016 | Clement | ................. | F16L 13/10 |

* cited by examiner

*Primary Examiner* — Patrick F Brinson
(74) *Attorney, Agent, or Firm* — John K. Park; Park Law Firm (57) ABSTRACT

A shield for a pipe carrying fluid includes a pipe-engaging portion and a shielding portion. The pipe-engaging portion is configured for holding the shield in place with respect to the pipe. The shielding portion is fixed to the pipe-engaging portion and configured for blocking at least one side of the pipe and protecting the pipe against external disturbance applied in a specific direction. The pipe-engaging portion may be configured for engaging and holding in place the pipe. The pipe-engaging portion is configured for engaging and holding in place the pipe. Alternatively, the pipe-engaging portion is configured for being disposed in a vicinity of the pipe and holding the shield portion in place with respect to the pipe.

7 Claims, 7 Drawing Sheets

SHIELD FOR PIPES CARRYING FLUID

The present invention relates to a shield for pipes carrying fluid.

BACKGROUND OF THE INVENTION

The present invention relates to a shield for pipes carrying fluid.

Pipes are widely used to carry liquid or gas from one place to another very conveniently.

Frequently, the pipes should be buried in other medium such as wall or floor. That is, they are hidden behind another surface.

In such situations, the pipes may be in the way when a surface-penetrating operation is done on the surface hiding the pipes.

Accordingly, a need for a shield for pipes carrying fluid has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a shield for pipes carrying fluid.

An aspect of the invention provides a shield for a pipe carrying fluid.

The shield for a pipe carrying fluid comprises a pipe-engaging portion and a shielding portion.

The pipe-engaging portion is configured for holding the shield in place with respect to the pipe.

The shielding portion is fixed to the pipe-engaging portion and configured for blocking at least one side of the pipe and protecting the pipe against external disturbance applied in a specific direction.

The pipe-engaging portion may be configured for engaging and holding in place the pipe.

The pipe-engaging portion may comprise a single faster engaging through an elongated contacting portion with the pipe.

The pipe-engaging portion may comprise a plurality of fasteners, each of which is fixed to the shielding portion.

The faster may comprise a clip, a clamp, an adjustable clamp, hook-and-loop fastener, or doubled sided tape.

The clip may be flexible and has an opening smaller than a diameter of the pipe.

The clip may comprise two guiding portions provided at end portions of the clip configured for receiving the pipe smoothly.

The clamp may comprise a plurality of ring-shaped portions, each of which is configured for engaging a corresponding fastener provided on the pipe.

The pipe-engaging portion may be configured for being disposed in a vicinity of the pipe and holding the shield portion in place with respect to the pipe.

The shield portion may engage a support installed at an external medium through fastener such as a plurality of rings.

The shield portion may comprise a plate having a width larger than a diameter of the pipe and a specific length extending in a length direction of the pipe.

The plate may be flat.

Alternatively, the plate may be curved in a width direction of the pipe.

The shield portion may further comprise a plurality of cutouts provided along edges of the plate, so that the plate is made curved partially following a curved surface of the pipe.

The shield may further comprise a covering shield portion configured for engaging the shield portion through a fastener such as glue provided between the shield portion and the covering shield portion, so as to enclose and protect a portion of the pipe.

Each of the shield portion and the covering shield portion may have substantially a semicircular cross-section.

The shield may further comprise a plurality of nail holes configured for fixing the shield portion to an external support passing by the pipe.

The advantages of the present invention are: (1) the shield for pipes carrying fluid according to the invention is very effective but simple in structure; and (2) the shield for pipes carrying fluid is easy to install at an existing pipe of any type.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The invention is a protective shield that can be easily placed on the pipes for fluids, including gas and liquid.

Plastic or PVC, and other soft materials, are used for pipes designed to carry fluids. Unfortunately, once the pipes are installed, especially behind a drywall or a fire protective wall, the locations for these pipes are hidden. When a person drills a hole or nails into these dry walls and/or protective wall, the person may unintentionally drill a hole or nail into the pipes behind the walls, causing leaks and sometimes dangerous conditions.

This invention is to provide protective shield to prevent such unintentional drilling or nailing into the pipes behind the walls.

The shield according to this invention may be easily installed over preexisting pipes using one or more clips and/or other attachments placed along the length of the shield.

The attachments may be clips, clamps, Velcro® (hook-and-loop fasteners), straps, ties, tapes, and other attaching means. Also, alternately, the shield may have attaching points for straps to be placed through for securely tying the shield over the pipes.

Figure 1:
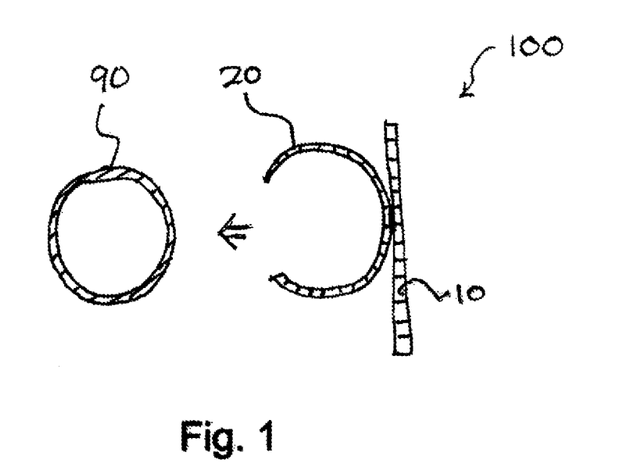
FIG. 1 is a cross-sectional view showing a shield for pipes according to an embodiment of the invention.

In FIG. 1, a shield (100) is attached to a pipe (90). The shield portion (10) may be curved or straight. The attachment means may comprise a clip (20) as illustrated. The clip (20) may have an opening smaller than the diameter of the pipe (90), and it may be flexible so that the opening can receive the pipe (90) within. The clip (20) may be attached to the shield portion (10) fixedly.

Figure 2:
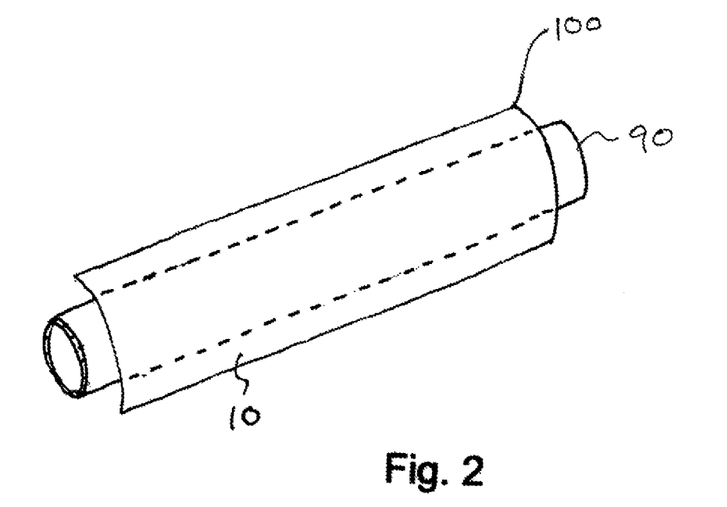
FIG. 2 is a perspective view showing a shield for pipes according to an embodiment of the invention.

In FIG. 2, the shield (100) is provided in a form much longer than the diameter of the pipe (90) or the width of the shield portion (10). The shield portion (10) may be attached to the pipe by any possible attachment means including a clip, a clamp, an adjustable clip, Velcro®, double sided tape, etc., which are well known to the community.

Figure 3:
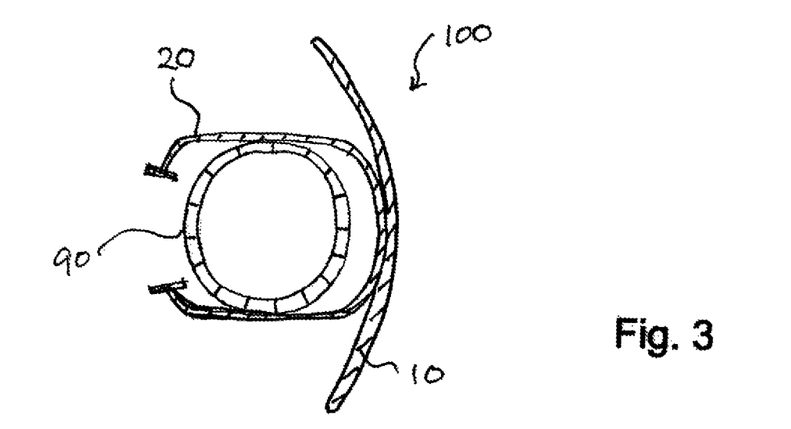
FIG. 3 is a cross-sectional view showing a shield for pipes according to another embodiment of the invention.

In FIG. 3, the clip (20) may have any shape as illustrated. The shield portion (10) may be curved.

Figure 4:
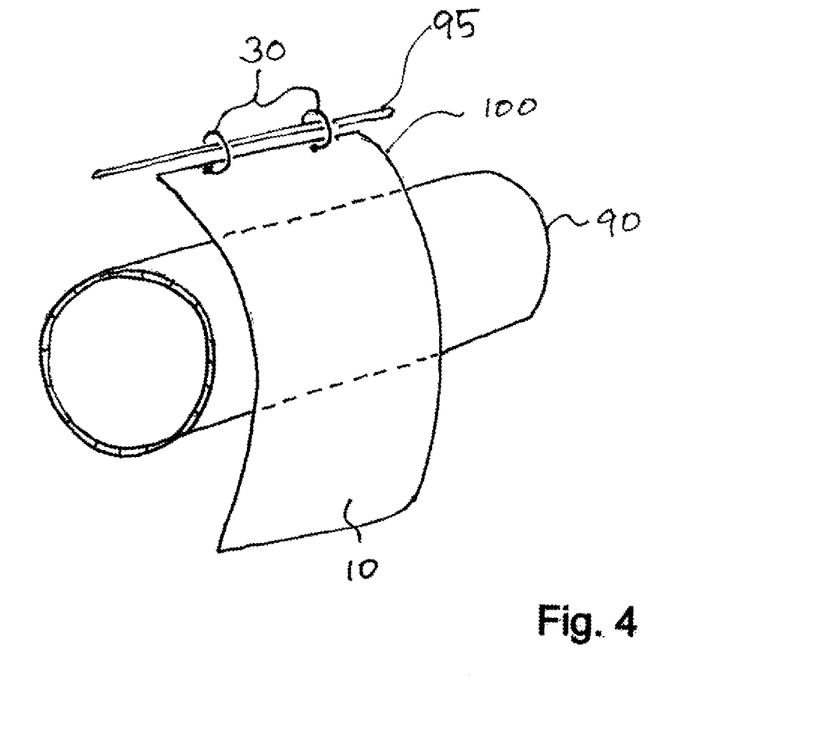
FIG. 4 is a perspective view showing a shield for pipes according to still another embodiment of the invention.

In FIG. 4, the shield portion (10) of the shield (100) may be hung from a support (95) through another exemplary attachment means such as rings (30) or mechanical fasteners as illustrated. Even in this embodiment, the shield (100) may be provided further with the clip (20) as shown in FIG. 3.

Figure 5:
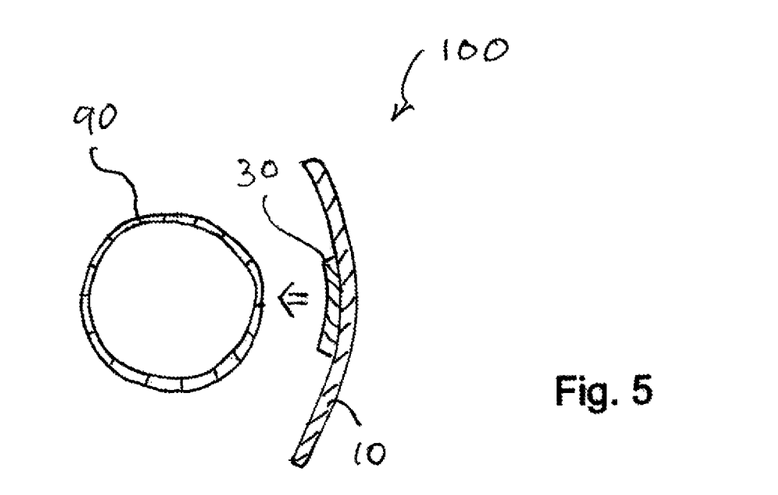
FIG. 5 is a cross-sectional view showing a shield for pipes according to still another embodiment of the invention.

In FIG. 5, the shield portion (10) of the shield (100) may be attached to the pipe (90) through still another exemplary attachment means such as Velcro® or double sided tape (30).

Figure 6:
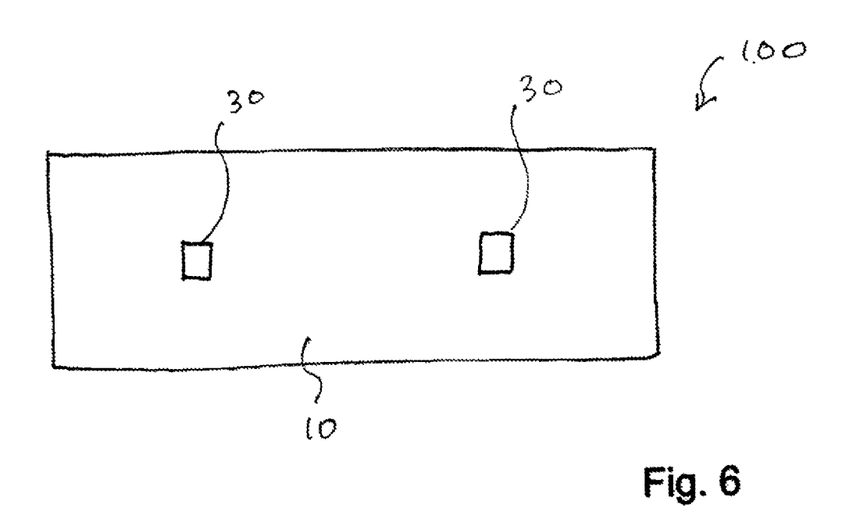
FIG. 6 is a front view showing a shield for pipes according to still another embodiment of the invention.

In FIG. 6, the attachment means (30) may be applied to two or more positions on a front inner surface of the shield portion (10).

Figure 7:
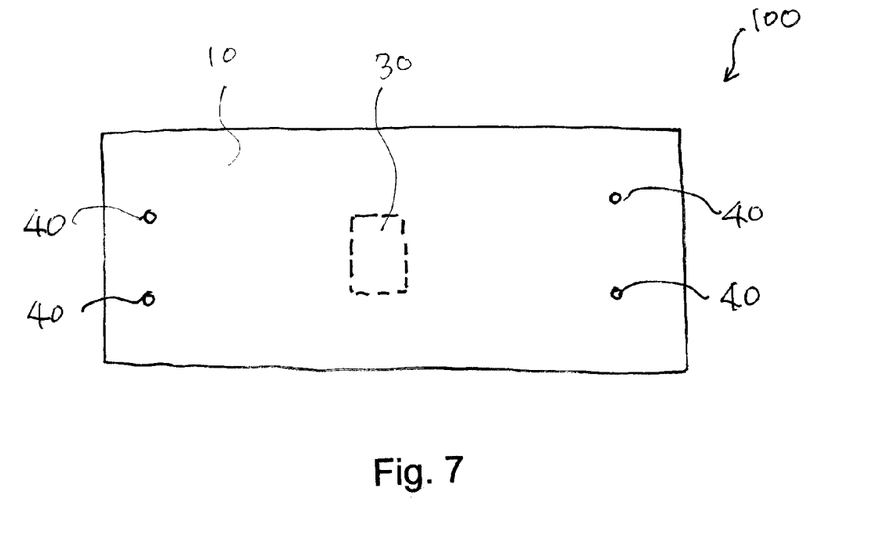
FIG. 7 is a rear view showing a shield for pipes according to still another embodiment of the invention.

In FIG. 7, the shield (100) may further comprise a plurality of nail holes (40) configured for fixing the shield (100) to a wall or other external support passing by the pipe (90).

Figure 8:
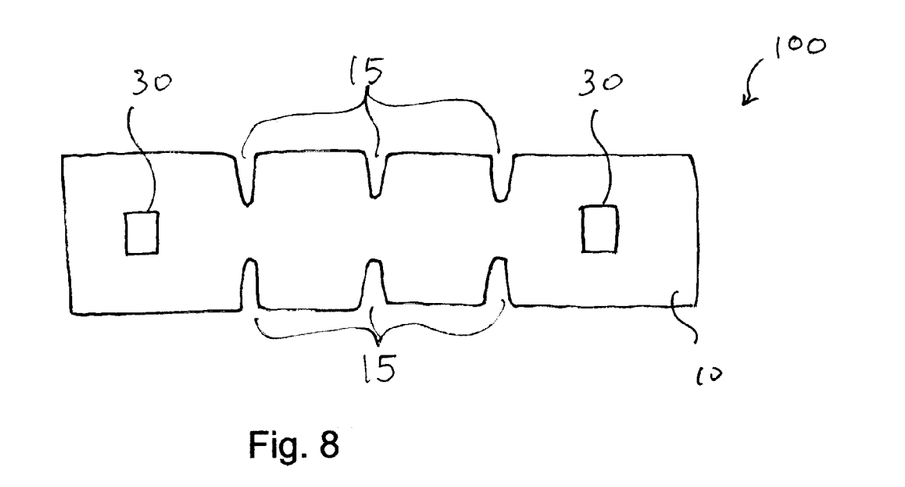
FIG. 8 is a front view showing a shield for pipes according to still another embodiment of the invention.

In FIG. 8, the shield portion (10) may have a plurality of cutouts (15) along edges thereof, so as to accommodate the shape of the pip (90).

Figure 9:
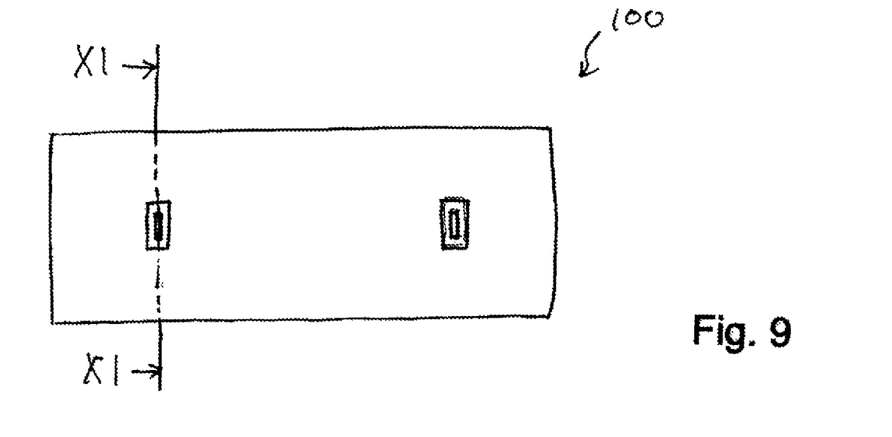
FIG. 9 is a front view showing a shield for pipes according to still another embodiment of the invention.
Figure 10:
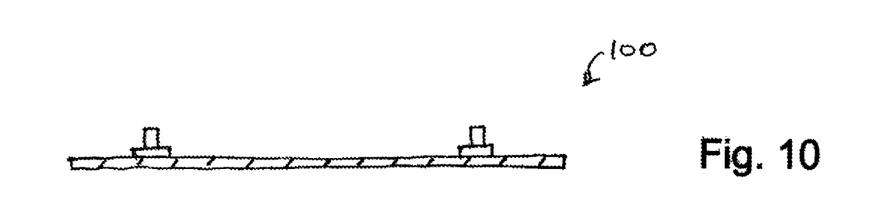
FIG. 10 is a side view showing the shield for pipes of FIG. 9.
Figure 11:
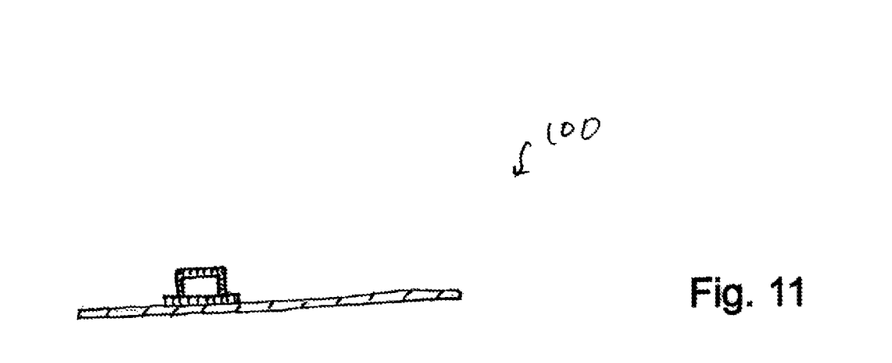
FIG. 11 is a cross-sectional view of the shield for pipes along line XI-XI of FIG. 9.

In FIGS. 9 through 11, the attachment means may have any shapes as long as they work with the other components or the environment and attach the shield portion (10) to the pipe (90). The illustrated rectangular ring portion may be coupled to an accommodating fastener provided on the pipe (90).

Figures 12, 13:
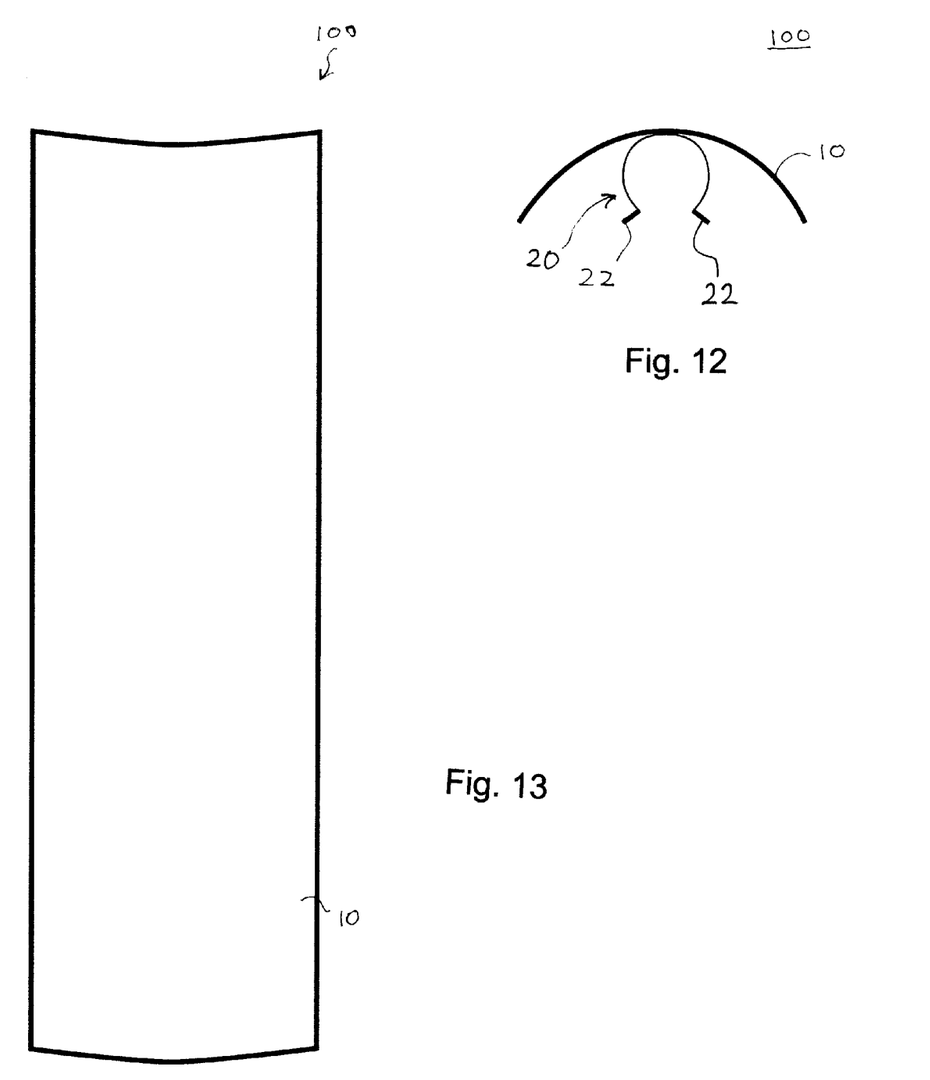
FIG. 12 is a cross-sectional view showing a shield for pipes according to still another embodiment of the invention.
FIG. 13 is a perspective rear view of the shield for pipes of FIG. 12.

In FIGS. 12 and 13, the clip (20) may have two guiding portion at the end portions (22), and the shield portion (10) may be curved as illustrated.

Figure 14:
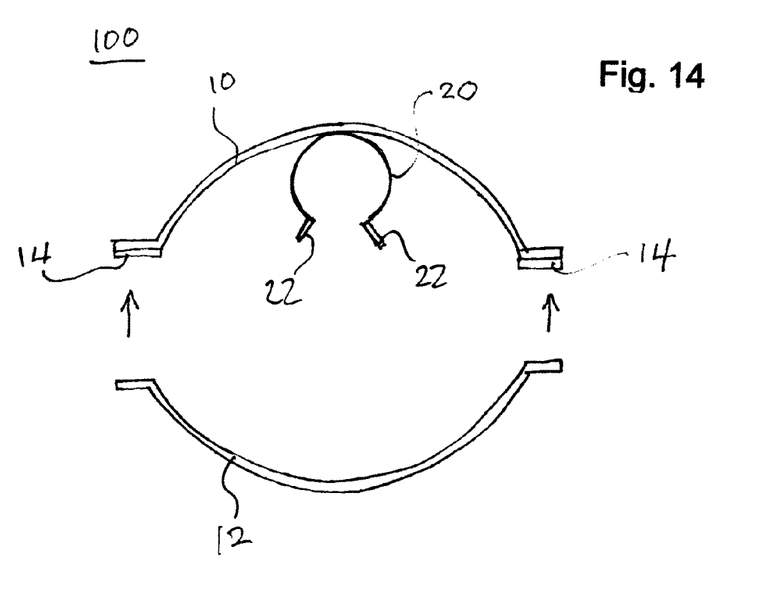
FIG. 14 is a cross-sectional view showing a shield for pipes according to still another embodiment of the invention.
Figure 15:
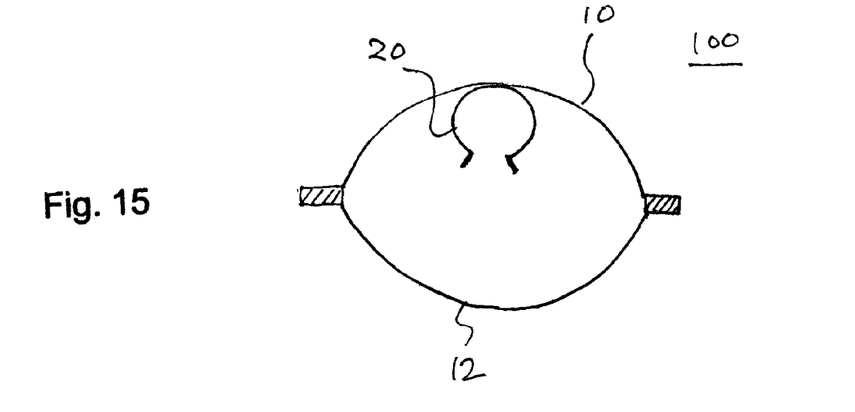
FIG. 15 is a cross-sectional view of the shield for pipes of FIG. 14.

In FIGS. 14 and 15, the shield may be formed in a tubular shape, by adding a covering shield portion (12). The shield portion (10) and the covering shield portion (12) may engage and close down on each other through a fastener (14) such as Velcro®. Thus, the pipe (not shown) in the clip (20) may be protected further.

An object of the invention is to provide a shield (100) for pipes (90) carrying fluid.

An aspect of the invention provides a shield (100) for a pipe (90) carrying fluid as shown in FIGS. 1-15.

The shield (100) for a pipe carrying fluid comprises a pipe-engaging portion (20) and a shielding portion (10).

The pipe-engaging portion (20) is configured for holding the shield (100) in place with respect to the pipe (90). That is, the pipe-engaging portion (20) may be connected to the shield portion (10) physically through some fastening methods, or alternately may not be connected directly to the shield portion (10), but they are maintained in respective places with respect to each other by being anchored separately to an external medium such as wall, floor, or some rigging devices (not shown).

The shielding portion (10) is fixed to the pipe-engaging portion (10) and configured for blocking at least one side of the pipe (90) and protecting the pipe (90) against any external disturbances applied in a specific direction such as drill tip or nail.

The pipe-engaging portion (20) may be configured for engaging physically and directly and holding in place the pipe (90) as shown in FIGS. 1, 3, 5, 12, and 14.

The pipe-engaging portion (20) may comprise a single faster engaging through an elongated contacting portion with the pipe. That is, the engaging portion between the shield portion (10) and the pipe-engaging portion (20) in FIG. 1 may be provided all along the length portion in FIG. 2.

The pipe-engaging portion (20) may comprise a plurality of fasteners (30), each of which is fixed to the shielding portion (10), as shown in FIGS. 6, 8, and 9. If the shield (100) is relatively short, then just one fastener (30) may be enough.

The faster may comprise a clip, a clamp, an adjustable clamp, hook-and-loop fastener, or doubled sided tape. However, it is not limited to them. As long as working as a fixing means of the shield portion (10) against the pipe (90), any conventional devices can be adopted.

The clip (20) may be flexible and has an opening smaller than a diameter of the pipe as shown in FIGS. 1, 3, 12, and 14.

The clip (20) may comprise two guiding portions (22) provided at end portions of the clip (20) configured for receiving the pipe (90) smoothly as shown in FIGS. 3, 12, 14, and 15.

The clamp may comprise a plurality of ring-shaped portions, each of which is configured for engaging a corresponding fastener (not shown) provided on the pipe (90) as shown in FIGS. 9-11.

The pipe-engaging portion (20) may be configured for being disposed in a vicinity of the pipe (90) and holding the shield portion (10) in place with respect to the pipe (90) as shown in FIG. 4.

The shield portion (10) may engage a support (95) installed at an external medium through fastener such as a plurality of rings (30) as shown in FIG. 4.

The shield portion (10) may comprise a plate having a width larger than a diameter of the pipe (90) and a specific length extending in a length direction of the pipe (90) to be protected.

The plate (10) may be flat.

Alternatively, the plate (10) may be curved in a width direction of the pipe, which may be helpful to ward off an intruding sharp point.

In certain embodiments of the invention, the shield portion (10) may further comprise a plurality of cutouts (15) provided along edges of the plate (10) as shown in FIG. 8, so that the plate (10) is made curved partially following a curved surface of the pipe (90). Prior to installing, the shield portion (10) may be provided flat with such cutouts (15). The curved structure may be obtained in the process of installing, optimizing the curvature according to the diameter of the pipe (90).

In certain embodiments of the present invention, the shield (100) may further comprise a covering shield portion (12) configured for engaging the shield portion (10) through a fastener (14) such as glue provided between the shield portion (10) and the covering shield portion (12), so as to enclose and protect a portion of the pipe (90).

Each of the shield portion (10) and the covering shield portion (12) may have substantially a semicircular cross-section.

In certain embodiments of the invention, the shield (100) may further comprise a plurality of nail holes (40) configured for fixing the shield portion (10) to an external support (not shown) passing by the pipe (90) as shown in FIG. 7.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A shield for a pipe carrying fluid, the shield comprising:
a pipe-engaging portion configured for holding the shield in place with respect to the pipe; and
a shielding portion fixed to the pipe-engaging portion and configured for blocking at least one side of the pipe and protecting the pipe against external disturbance applied in a specific direction,
wherein the pipe-engaging portion is configured for engaging and holding in place the pipe,
wherein the pipe-engaging portion comprises a plurality of fasteners, each of which is fixed to the shielding portion,
wherein the plurality of fasteners comprise
a plurality of ring-shaped portions, each of which is configured for engaging a corresponding fastener provided on the pipe.

2. A shield for a pipe carrying fluid, the shield comprising:
a pipe-engaging portion configured for holding the shield in place with respect to the pipe; and
a shielding portion fixed to the pipe-engaging portion and configured for blocking at least one side of the pipe and protecting the pipe against external disturbance applied in a specific direction,
wherein the pipe-engaging portion is configured for being disposed in a vicinity of the pipe and holding the shield portion in place with respect to the pipe, and
wherein the shielding portion engages a support installed at an external location through a plurality of rings.

3. A shield for a pipe carrying fluid, the shield comprising:
a pipe-engaging portion configured for holding the shield in place with respect to the pipe; and
a shielding portion fixed to the pipe-engaging portion and configured for blocking at least one side of the pipe and protecting the pipe against external disturbance applied in a specific direction,
wherein the shielding portion comprises a plate having a width larger than a diameter of the pipe and a specific length extending in a length direction of the pipe,
wherein the shielding portion further comprises a plurality of cutouts provided along edges of the plate.

4. The shield of claim 3, wherein the plate is flat or is curved partially following a curved surface of the pipe.

5. The shield of claim 4, wherein the plate is curved in a width direction of the pipe.

6. A shield for a pipe carrying fluid, the shield comprising:
a pipe-engaging portion configured for holding the shield in place with respect to the pipe; and
a shielding portion fixed to the pipe-engaging portion and configured for blocking at least one side of the pipe and protecting the pipe against external disturbance applied in a specific direction,
further comprising a covering shielding portion configured for engaging the shielding portion through an engaging fastener comprising glue provided between the shielding portion and the covering shielding portion, so as to enclose and protect a portion of the pipe, wherein each of the shielding portion and the covering shielding portion has substantially a semicircular cross-section.

7. The shield of claim 1, further comprising a plurality of nail holes configured for fixing the shielding portion to an external support passing by the pipe.

* * * * *